United States Patent [19]

Peterson

[11] Patent Number: 5,144,281
[45] Date of Patent: Sep. 1, 1992

[54] HOOD ORNAMENT THEFT ALARM

[76] Inventor: Norman E. Peterson, 1470 Harper Rd. #12, Mason, Mich. 48854

[21] Appl. No.: 571,105

[22] Filed: Aug. 23, 1990

[51] Int. Cl.$^5$ .............................................. B60Q 1/00
[52] U.S. Cl. ................................... 340/426; 340/568
[58] Field of Search ............. 340/426, 429, 548, 568, 340/668, 686, 687; 307/10.2; 200/61.93, 538, 543, 331, 332

[56] References Cited

U.S. PATENT DOCUMENTS

| | | |
|---|---|---|
| 1,131,405 | 3/1915 | Merrill ................................ 340/426 |
| 2,571,534 | 10/1951 | Brooks ............................. 200/61.93 |
| 4,882,563 | 11/1989 | Perlman et al. ..................... 340/426 |
| 4,994,785 | 2/1991 | Perlman et al. ................ 307/10.2 X |
| 5,059,945 | 10/1991 | Scheele et al. ........................ 340/426 |

FOREIGN PATENT DOCUMENTS 90107758  7/1990  World Int. Prop. O. ......... 307/10.2

Primary Examiner—Jin F. Ng
Assistant Examiner—Brian R. Tumm
Attorney, Agent, or Firm—Richard C. Litman

[57] ABSTRACT

A theft alarm for an automotive hood ornament which utilizes simple components and can be installed without removing any factory installed parts. The switch is contained in a plastic and aluminum housing which is mounted to the automobile under the hood. A lever extends out from the housing and contains a slot for attaching a ball chain. The ball chain is connected at one end to the lever and at the other end to the retaining spring of the hood ornament. The switch is connected to the automobile's battery and horn. When a thief attempts to pull the hood ornament off the automobile the retaining spring compresses and pulls up on the ball chain and lever. The swtich closes and sounds the automobile's horn. Every attempt to remove the hood ornament is matched by the sound of the automobile's horn.

11 Claims, 1 Drawing Sheet

U.S. Patent    Sep. 1, 1992    5,144,281

HOOD ORNAMENT THEFT ALARM

FIELD OF INVENTION

This invention relates generally to theft alarms, and more particularly to an improved theft alarm for the hood ornament of an automobile.

BACKGROUND OF THE INVENTION

Hood ornaments on expensive cars are stolen on a daily basis. These hood ornaments are seated in shallow sockets defined in the hood of the automobile, and are retained by elastic means, typically a spring, that engage the hood ornament and pass through an aperture in the hood and are retained on the underside of the hood. If they are struck by anything, as they inevitably are over the life of the car, rather than break off, because of the resilient mounting they just deflect and snap back upright when the deflecting force abates.

This system works well when the hood ornament is struck. However, this mounting system does not work well in preventing theft of the hood ornament. Although perhaps a few years ago hood ornament theft was generally unknown, increasingly, whether for reasons of monetary gain, resentment, thrills, or for personal motives, thieves increasingly have begun to steal hood ornaments. Such thievery puts the owners not only to the cost of replacing the hood ornament, but to the nuisance of having to go to the dealership or other source and take the time to secure another ornament and install it.

The need has arisen for a hood ornament theft alarm to thwart the intentions of would be thieves. It follows that any system that is simple to install, inexpensive to manufacture and reliable due to its resistance to the elements will present a unique advancement of the art.

DESCRIPTION OF THE RELATED ART

The broad concept of a hood ornament theft alarm is generally known. There have been devices in the past which are installed beneath the hood to sound the horn when the ornament is deflected, thus hopefully preventing the theft of the hood ornament. These systems are typically very complex in their installation and expensive to purchase. U.S. Pat. No. 1,131,405 issued to Merrill discloses an alarm to protect against the theft of articles which are not permanently attached to the automobile.

U.S. Pat. No. 4,882,563 issued to Perlman et al. discloses a hood ornament theft alarm which is mounted under the hood and replaces some of the hardware used to secure the hood ornament. A threaded bolt is used to adjust the tension of a spring until two contacts a spaced by one eighth of an inch. One of the contacts is wired to the battery and the other is wired to the horn. While this system is functional, it is complex to install and the contacts are exposed to the elements, allowing for the possibility of corrosion and malfunction of the alarm.

None of the above listed patents are seen to disclose the specific arrangement of concepts disclosed by the present invention.

SUMMARY OF THE INVENTION

By the present invention, an improved hood ornament theft alarm is provided which is simple to manufacture, easy to install and highly resistant to the elements. The device of the present invention is an alarm that can be added on to a car without the removal of any factory parts. The switch for the alarm mounts under the hood onto the front clip brace of the automobile. One end of a ball chain is hooked onto the spring of the hood ornament, and the other end of the ball chain is attached to a spring loaded lever arm. The lever arm extends out from the switch housing and is the switch activating means. When the hood ornament is deflected or pulled away from the car, the spring compresses, tension is applied to the ball chain, and the lever arm is pulled upwards. As the lever arm is pulled upwards, it presses an activating button on the micro switch. The switch activates when the button moves two hundredths of an inch or more. As long as the hood ornament is deflected the switch will be activated and the horn will sound. When the hood ornament is released, or resumes its normal position, the lever arm releases the activating button and the horn ceases to blow. The present invention attempts to discourage thieves by sounding the horn every time the hood ornament is moved.

Accordingly, one of the objects of the present invention is to provide an improved hood ornament alarm which is simple and inexpensive to manufacture, and easy to install.

Another object of the present invention is to provide an improved hood ornament alarm which is resistant to the elements, and therefore very reliable.

A further object of the present invention is to provide an improved hood ornament alarm which can be installed on an automobile without removing any factory installed parts.

A still further object of the present invention is to provide an improved hood ornament alarm which automatically resets itself after an attempt to steal the hood ornament has been made.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 2:
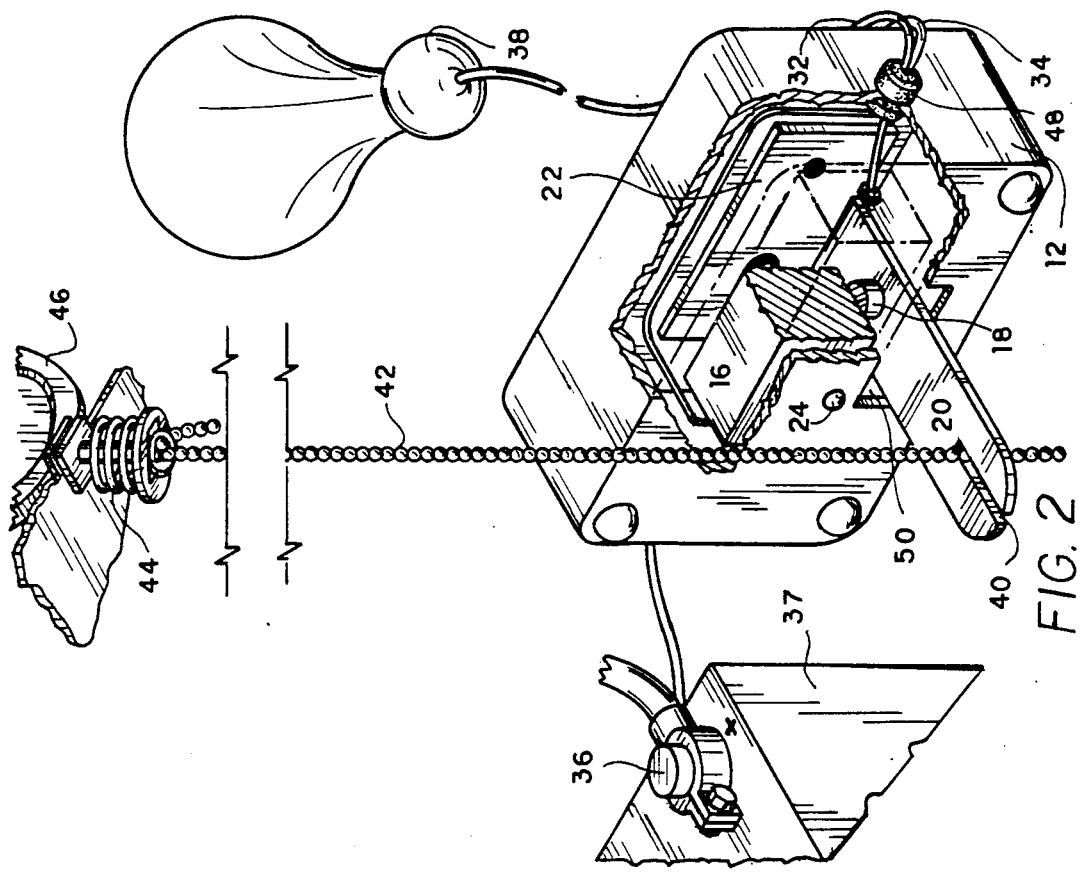
FIG. 2 is a rear perspective view partly in section of the present invention.
Figure 1:
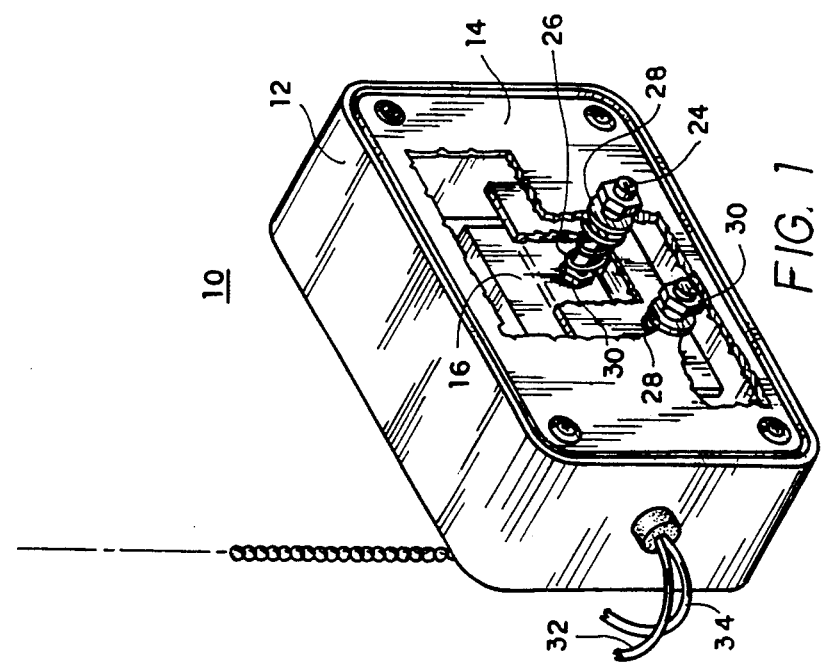
FIG. 1 is an environmental perspective view of the present invention, partly in section, showing the internal components of the alarm and the external connections to the horn, battery and hood ornament.

Referring now to the drawings, particularly FIG. 1, the present invention will be understood to relate to an improved hood ornament theft alarm. The alarm 10 is formed of housing 12, preferably formed of plastic, and cover panel 14 preferably made of aluminum. The micro switch 16 is secured to the housing 12 by fasteners 24 which are preferably two #6-32×1⅜ inch round head metal screws. The micro switch 16 contains button 18 which lies adjacent to switch lever 20. The switch lever 20 contains an integral mounting plate 22, which is used to mount the switch lever 20 and to bias the lever 20 in a de-activated position. The preferred material for the switch lever 20 is 17 gauge aluminum while the preferred material for the cover panel 14 is 21 gauge aluminum.

The switch lever 20 is biased in a de-activated position by compression springs 26. Two compression springs 26 are placed around the screws 24, and between the switch 16 and the switch lever mounting plate 22. Two rubber washers 28 are placed on opposing sides of the cover panel 14 on each screw 24. The screws 24 secure to the switch 16 and housing 12, 14 by the use of two hex nuts 30 placed on each screw 24.

The switch includes two electrical contacts to which two wires 32, 34 are connected. One of these wires are connected to the positive terminal 36 of the car battery 37, and the other is connected to the automobile's horn 38. When the switch is activated the switch creates a closed circuit between the two wires 32 and 34, thereby sounding the automobile's horn 38.

A slot 40 is included in lever 20 to receive one end of a ball chain 42. The other end of the ball chain 42 is attached to the retaining spring 44 of the hood ornament 46. As the hood ornament is deflected or pulled away from the automobile, the spring 44 will compress thereby pulling up on chain 42 and also lever 20. The use of the ball chain 42 greatly simplifies the installation of the alarm 10, in that it allows the alarm 10 to be installed in most cars with spring retained hood ornaments without the need to remove any factory installed parts.

An advantage to the alarm of the present invention is that it shields the switch activating components from the elements. Rubber grommet 48 seals the opening in the housing 12 through which the wires 32 and 34 pass. Opening 50 in the housing 12 is sized to be as small as possible to maximize the shielding capability of housing 12.

A preferred method for installing the hood ornament alarm 10 of the present invention is described by the following. Two holes are drilled into the center front clip brace of the automobile, and the alarm housing is mounted into these holes with two #6-32 hexagonal nuts 24. When the alarm housing 12, 14 is secured, the ball chain 42 is connected to the hood ornament's spring 44 and to the switch lever 20. One of the wires 32, 34 coming out of the alarm housing 12 through the rubber grommet 48 is connected to the positive terminal 36 of the automotive's battery 37. The other wire 34, 32 passing through the rubber grommet 48 is connected to the automotive's horn 38. The installation process is so simple, it can be completed in approximately 40 minutes. The ball chain 42 is extremely versatile in that it can attach to any hood ornament with a retaining spring 44 that is mounted onto the stationary part of an automotive's hood. The ball chain 42 is very simple and therefore easy to install; no removal of factory parts is required for the installation of the alarm 10.

In operation of the device the alarm 10 will activate upon movement of the hood ornament 46. When the hood ornament is tipped or pulled away from the automobile the spring 44 will compress and pull up on ball chain 42 as well as lever 20. As lever 20 is pulled upwards, it contacts button 18 and presses the button up into the main portion of switch 16. Only a slight movement of button 18 is needed to activate switch 16. When the switch is activated a closed circuit is made between the horn 38 and the battery 37, thereby sounding the horn 38. When the pressure or force on the hood ornament is released, the spring 44 will extend and the springs 24 will force the lever 20 back to a the de-activated position. The result is that the horn will sound every time the hood ornament is moved, hopefully scaring away would be thieves.

It is to be understood that the present invention is not limited to the sole embodiment described above, but encompasses any and all embodiments within the scope of the following claims.

I claim:

1. A hood ornament alarm for a hood ornament attached to a hood with a resilient means extending through a hole in said hood to retain said ornament in place, said hood ornament alarm comprising:

switch housing means attached underneath said hood of an automobile;

switch means contained within said switch housing means:

mounting means for attaching said hood ornament alarm underneath said hood of said automobile;

switch activating means for activating said switch means;

a lever attached to said switch housing means and adjacent to said switch activating means, said lever containing a vertical portion and a horizontal portion;

spring means for biasing said lever in a de-activated position wherein said spring means are axially disposed about said mounting means, said spring means disposed between said vertical portion of said lever and said switch means;

connection means for connecting said lever to said resilient means;

electrical contact means for connecting said switch means to a vehicle power point and a vehicle horn;

whereby when said hood ornament is deflected or pulled away from said automobile, said switch means will activate thereby completing a circuit and sounding said vehicle horn.

2. The hood ornament alarm according to claim 1 wherein said mounting means pass through said switch housing means, said switch means and said vertical portion of said lever.

3. The hood ornament alarm according to claim 1 wherein said lever is made of aluminum.

4. The hood ornament alarm according to claim 1 wherein said switch activating means are integral with said switch means, said switch activating means adjacent to said horizontal portion of said lever;

whereby when tension is applied to said connection means, said lever moves into an activated position and said horizontal portion of said lever presses said switch activating means thereby completing said circuit and sounding said vehicle horn.

5. The hood ornament alarm according to claim 1 wherein said connection means comprise a ball chain.

6. The hood ornament alarm according to claim 5 wherein said horizontal portion of said lever includes a slot, said slot for receiving said ball chain.

7. The hood ornament alarm according to claim 1 wherein said housing means are constructed of plastic.

8. The hood ornament alarm according to claim 1 wherein said mounting means pass through said switch housing means, said swtich means and said vertical portion of said lever; and wherein said spring means are axially disposed about said mounting means, said spring means disposed between said vertical portion of said lever and said switch means.

9. The hood ornament alarm according to claim 8 wherein said switch activating means are integral with said switch means, said switch activating means adjacent to said horizontal portion of said lever;

whereby when tension is applied to said connection means, said lever moves into an activated position and said horizontal portion of said lever presses said switch activating means thereby completing said circuit and sounding said vehicle horn.

10. The hood ornament alarm according to claim 9 wherein said connecting means comprise a ball chain.

11. The hood ornament alarm according to claim 10 wherein said horizontal portion of said lever includes a slot, said slot for receiving said ball chain.

* * * * *